United States Patent [19]
Bradley et al.

[11] Patent Number: 6,024,286
[45] Date of Patent: Feb. 15, 2000

[54] SMART CARD PROVIDING A PLURALITY OF INDEPENDENTLY ACCESSIBLE ACCOUNTS

[75] Inventors: James Frederick Bradley; Joanna Bradley, both of Middletown; Paul W. Cooper, Red Bank, all of N.J.

[73] Assignee: AT&T Corp, New York, N.Y.

[21] Appl. No.: 08/954,866

[22] Filed: Oct. 21, 1997

[51] Int. Cl.[7] ................................................. G06K 19/06
[52] U.S. Cl. ............................................................ 235/492
[58] Field of Search ................................... 235/492, 375, 235/380

[56] References Cited

U.S. PATENT DOCUMENTS

| | | | |
|---|---|---|---|
| 4,443,027 | 4/1984 | McNeely et al. | 283/83 |
| 4,575,621 | 3/1986 | Dreifus | 235/380 |
| 5,326,964 | 7/1994 | Risser | 235/487 |
| 5,506,395 | 4/1996 | Eppley | 235/486 |
| 5,530,232 | 6/1996 | Taylor | 235/380 |
| 5,594,233 | 1/1997 | Kenneth et al. | 235/492 |
| 5,883,377 | 3/1999 | Chapin, Jr. | 235/493 |
| 5,887,065 | 3/1999 | Audebert | 380/23 |

*Primary Examiner*—Donald Hajec
*Assistant Examiner*—Daniel H. Sherr

[57] ABSTRACT

A smart card having a planar surface is provided. A plurality of sectors extend over the planar surface. Each sector includes a set of transaction processing electronics for performing account transactions in a manner independently operable from every other sector. The transaction processing electronics typically include a processor and memory for processing and storing data, a power coupler for transmitting power to the processor and memory, and a data coupler for transmitting data between the processor and memory and a smart card reader. The smart card serves as a substitute for a plurality of single-application cards. In one particular example, the smart card maintains up to four individual accounts, where each account is associated with a different quadrant of the card. The user simply selects the appropriate account by properly orienting the card upon inserting it into a smart card reader. The smart card is labeled with the individual account names to ensure correct orientation when inserted into the reader. The card reader may display the currently active account so that the user can very that the desired account has been accessed.

10 Claims, 4 Drawing Sheets

SQAURE - 4/8

RECTANGLE - 8+/16+

HEXAGON - 6/12

CIRCLE - 8+/16+

SQAURE - 4/8    RECTANGLE - 8+/16+

HEXAGON - 6/12    CIRCLE - 8+/16+

SMART CARD PROVIDING A PLURALITY OF INDEPENDENTLY ACCESSIBLE ACCOUNTS

FIELD OF THE INVENTION

The invention is related to smart used for commerce, and more particularly to a smart card that offers a plurality of different accounts on a single card.

BACKGROUND OF THE INVENTION

Data cards include all types of financial cards such as credit, debit and A.T.M. cards as well as other cards that may contain non-financial data. Data cards are currently available in two types, magnetic strip cards and so-called smart cards. Imbedded within a smart card is an integrated circuit that includes a processor and memory for providing a variety of functions. One advantage of a smart card over a magnetic strip card is that the smart card contains all the intelligence necessary to complete a transaction locally at the transaction location. In contrast, transactions involving magnetic strip cards typically require verification via a transaction authorization service over a telephone network. Smart cards are expected to be used in an increasing range of transactions, including highway toll collection and dissemination of an individual's medical record information. Similar to a credit card, a smart card is typically limited to a single account.

If a consumer has several accounts he or she must have a different card for each account. U.S. Pat. No. 5,530,232 attempts to overcome this limitation by providing a smart card that may be used in connection with several different accounts. In this patent the electronic memory imbedded in the smart card is segmented for each account. Computer logic is used to ensure that different accounts are independently maintained. However, each time the cardholder uses the card, he or she would have to enter the account name and possibly some authorization code. In addition, as the number of accounts increases the corresponding amount of information that must be stored also increases. Accordingly, the required memory size, computing power, and dc power grows as the number of accounts per card grows.

It would therefore be desirable to provide a smart card that can support several different accounts while eliminating the need for complex user input and without unduly increasing the capacity of the individual electronic components embedded in the smart card.

SUMMARY OF THE INVENTION

In accordance with the present invention, a smart card having a planar surface is provided. A plurality of sectors extend over the planar surface. Each sector includes a set of transaction processing electronics for performing account transactions in a manner independently operable from every other sector. The transaction processing electronics typically include a processor and memory for processing and storing data, a power coupler for transmitting power to the processor and memory, and a data coupler for transmitting data between the processor and memory and a smart card reader.

The inventive smart card serves as a substitute for a plurality of single-application cards. In one particular embodiment of the invention, the smart card maintains up to four individual accounts, where each account is associated with a different quadrant of the card. The user simply selects the appropriate account by properly orienting the card upon inserting it into a smart card reader. The smart card is labeled with the individual account names to ensure correct orientation when inserted into the reader. The card reader may display the currently active account so that the user can verify that the desired account has been accessed.

DETAILED DESCRIPTION

Smart cards are available in two different configurations which are categorized based upon the manner in which information is written to and read from the card. One category employs electrical contacts that must physically engage a terminal in the corresponding smart card reader/writer. The other category of smart cards are so-called contactless smart cards in which information is transmitted to and received from the card by capacitive or inductive terminals so that physical contact is avoided. While the present invention will be described below in terms of a contactless smart card, one of ordinary skill in the art will recognize that the invention is equally applicable to smart cards requiring physical contact to transmit information.

Figure 1:
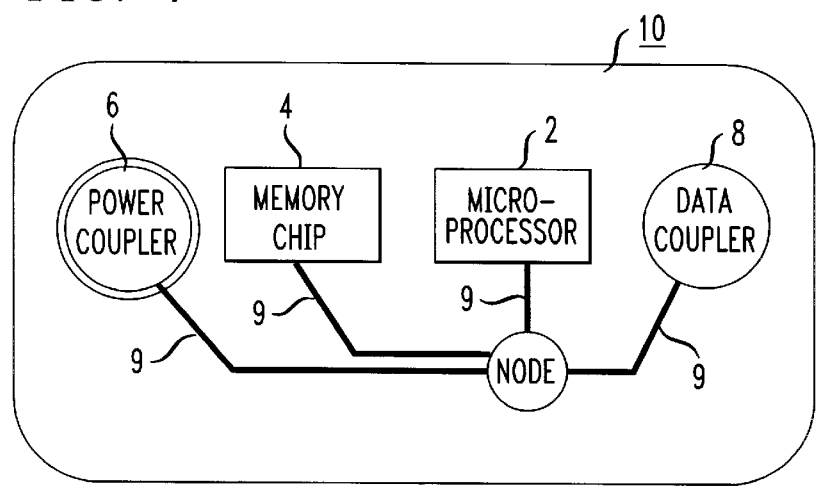
FIG. 1 shows a schematic diagram of a conventional contactless smart card.

FIG. 1 shows a schematic diagram of a conventional contactless smart card 10. A microprocessor 2 and memory chip 4 are embedded in the card 10 for processing and storing data. A power coupler 6 such as an inductive pickup coil provides power to the microprocessor 2 and memory chip 4 upon inserting the card 10 into a card reader. The card reader couples data to and from the card via a data coupler 8 that employs either capacitive or magnetic inductive coupling. The chips and couplers are interconnected by leads 9. To properly use the smart card, the card must be inserted into the card reader in the correct orientation so that the power and data couplers 6 and 8 are aligned with their respective counterparts in the card reader.

The electronic components embedded in the smart card which are necessary to process, store and transfer data therefrom will hereinafter be referred to as the transaction processing electronics. Thus, in the exemplary smart card shown in FIG. 1 the transaction processing electronics include the microprocessor 2, memory chip 4, couplers 6 and 8 and leads 9. Of course, other smart cards may have transaction processing electronics with different configurations and components from that shown in FIG. 1.

Figure 2:
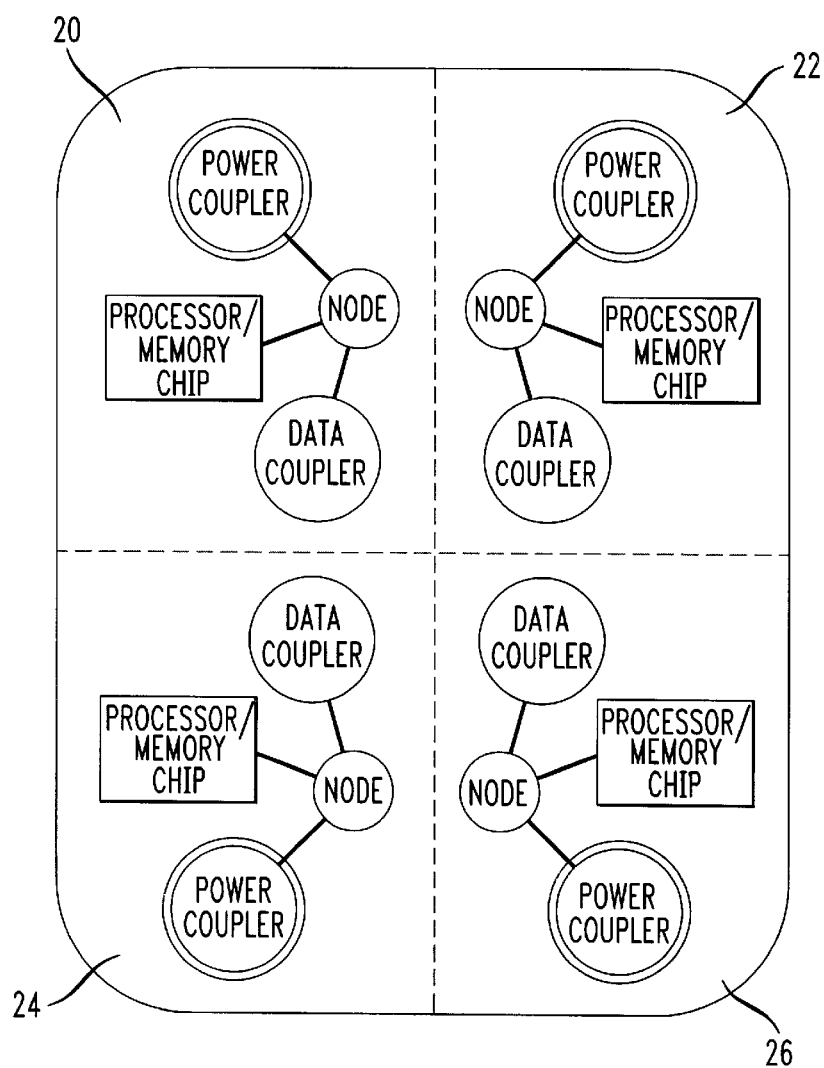
FIG. 2 shows one embodiment of the smart card constructed in accordance with the present invention.

In accordance with the present invention, a smart card is provided which has a plurality of sets of transaction processing electronics in which each set functions as an independent smart card for maintaining and processing a given account. FIG. 2 shows one embodiment of the inventive smart card that is based on the transaction processing electronics shown in FIG. 1. The card is divided into four quadrants 20, 22, 24 and 26. Embedded in each of the quadrants is a different set of transaction processing electronics. That is, each quadrant replicates the functionality of a conventional smart card. As a result the inventive smart card shown in FIG. 2 can maintain and process four different accounts that are independent of one another. Of course, the provision of four quadrants each supporting a different account is shown for illustrative purposes only. More generally, the inventive smart card may be divided into any number of sectors each having its own set of transaction processing electronics.

In operation, the user simply selects a desired account and inserts the smart card into a card reader so that the smart card sector corresponding to that account is properly aligned for processing therein. By inserting the smart card into the card reader a different orientation a different account is selected. Each sector is labeled with its account name to facilitate proper insertion into the card reader by the user.

The smart card of the present invention offers a number of advantages over a conventional smart card and the smart card disclosed in the previously mentioned patent. First, the amount of storage is increased without the need for coupling more power to the card. Second, the user selects the proper account simply by inserting the card in the correct orientation. Third, the inventive smart card offers a significant degree of flexibility in how individual accounts are maintained. For example, some accounts may be configured as read-only accounts that are accessible without special authorization. For example, medical information, emergency information, a drivers license or photo ID could be recorded in such an account.

Figure 3:
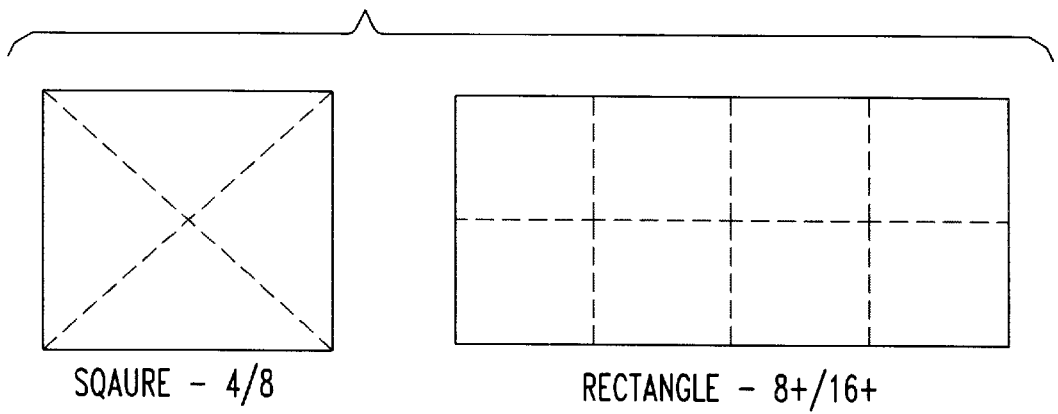
FIG. 3 shows alternative embodiments of the smart card constructed in accordance with the present invention.
Figure 3:
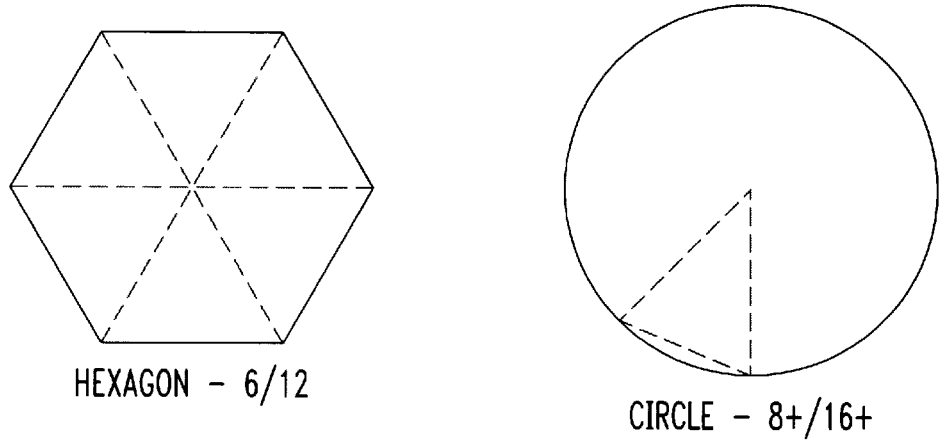

The size, shape and number of sectors available on the smart card may differ depending on the circumstances. In some cases, for example, it may be desirable to maximize the number of accounts that can be placed on the smart card by employing very small sectors. Sectors on both sides of the smart card may be used, thus doubling the number of accounts that can be maintained. Such a smart card requires a smart card reader that can read both sides of the card. In one simple arrangement the card reader accesses the corresponding sectors on both sides of the card and requires the user to select the desired application from between the two accounts. Other embodiments of the inventive smart card are also possible. For example, the smart card is not limited to a rectangular shape but, as shown in FIG. 3, may have a square, circular, hexagonal or other polygonal shape.

Figure 4:
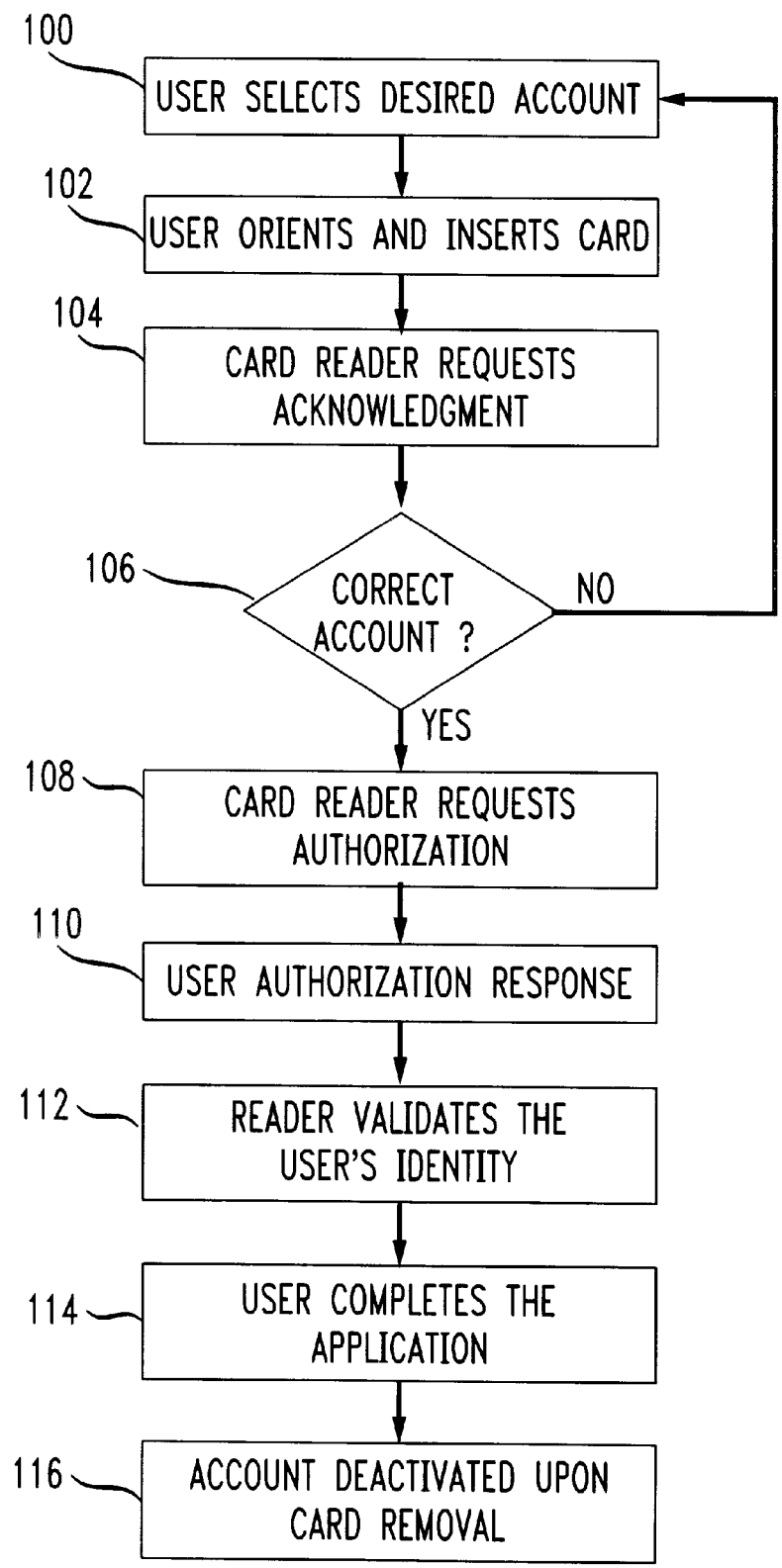
FIG. 4 shows a flowchart of an exemplary method performed in accordance with the present invention.

FIG. 4 shows a flowchart of an exemplary method in accordance with the present invention. In step 100 the user simply reads the labels on the card and selects the desired account from among the plurality of accounts that are available. The user next orients the card and inserts it into the card reader (step 102). Once the card is activated the card reader displays an acknowledgment request that the proper account has been selected (step 104). If the card was inadvertently inserted in an incorrect orientation, the card reader display signals the user to reinsert the card in the proper orientation. After the user acknowledges that the correct account has been activated, the card reader requests an authorization response if one is required to access that particular account (step 106). The user responds with an appropriate authorization, which may include finger print or voice identification or entry of a PIN code (step 108). The card reader validates the user based on the authentication and opens the account for the intended application (step 110). The user application is executed in a conventional manner (step 112) and the account is subsequently deactivated upon removing the card from the card reader (step 114).

Figure 5:
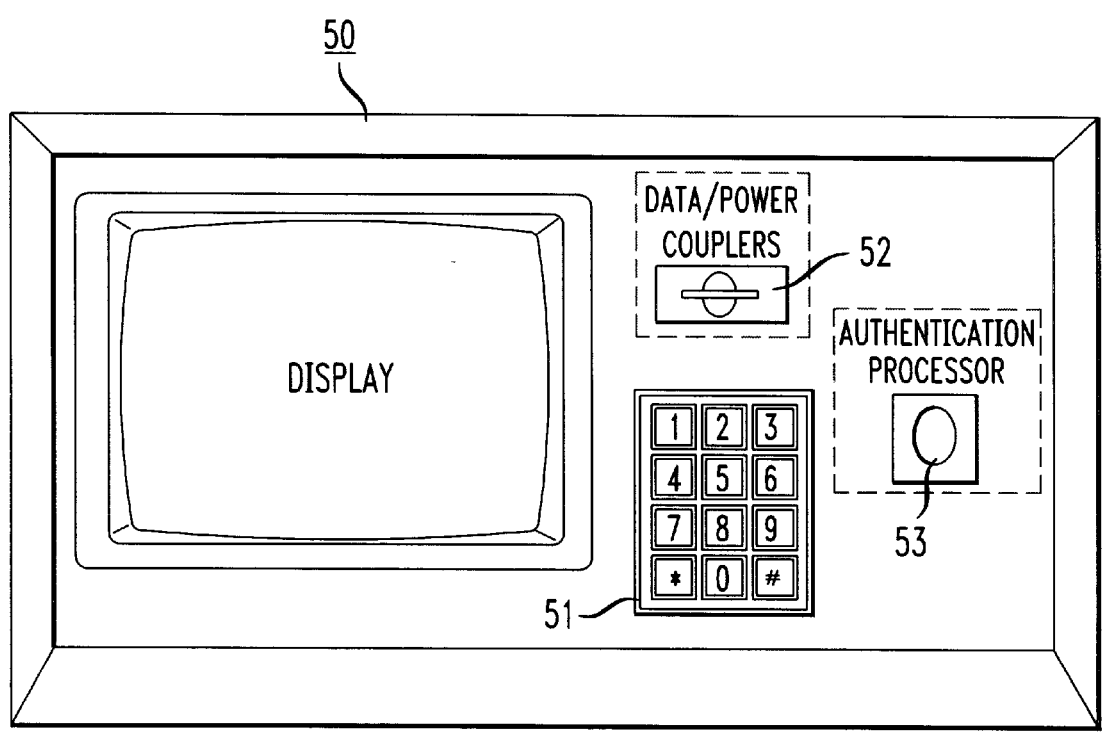
FIG. 5 shows a an embodiment of a smart card reader adapted for use in connection with the smart cards shows in FIGS. 2–3.

FIG. 5 shows the user interface portion of an embodiment of a smart card reader 50 which is configured for use with smart cards constructed in accordance with the present invention. As in a conventional smart card reader, the reader 50 includes a display screen 50, a keypad 51 for user entry, and a smart card slot 52 in which the smart card is inserted. An authentication processor 53 which employs a correlation technique involving voice, image, PIN number, or fingerprints may also be provided. Interior to the slot 52 are data couplers and power couplers corresponding to those located on the smart card for communicating with the smart card. The couplers are positioned in one quadrant of the slot 52 (in the case where the smart card is divided into quadrants) so that only the preselected account is read when the card is inserted in the proper orientation. The precise location and arrangement of the couplers in the smart card slot 52 will depend on the size, shape and number of sectors employed on the smart card. Information obtained from the smart card is directed to a processor (not shown). Additional details concerning the construction and operation of a smart card reader may be found in U.S. Pat. No. 5,594,233, for example.

We claim:

1. A smart card comprising:

a first plurality of sectors wherein each sector includes a set of transaction processing electronics for performing account transactions in a manner independently operable from every other of said sectors;

said first plurality of sectors being configured such that a user of the smart card can select a first account in a first sector of the first plurality of sectors by inserting the smart card into a smart card reader with the smart card having a first orientation relative to the smart card reader; and said first plurality of sectors being configured such that the user of the smart card can select a second account in a second sector of the first plurality of sectors by inserting the smart card into the smart card reader with the smart card having a second orientation relative to the smart card reader, the second orientation being different than the first orientation.

2. The smart card of claim 1 wherein said transaction processing electronics include: a processor and memory for processing and storing data; a power coupler for transmitting power to said processor and memory; and a data coupler for transmitting data between said processor and memory and a smart card reader.

3. The smart card of claim 1 further comprising:

a second plurality of sectors wherein each sector of the second plurality of sectors includes a set of transaction processing electronics for performing account transactions in a manner independently operable from every other of said sectors of the first and second plurality of sectors;

said second plurality of sectors being configured such that the user of the smart card can select a third account in a first sector of the second plurality of sectors by inserting the smart card into a smart card reader with the smart card having a third orientation relative to the smart card reader, the third orientation being different than the first orientation and different than the second orientation; and said second plurality of sectors being configured such that the user of the smart card can select a fourth account in a second sector of the second plurality of sectors by inserting the smart card into the smart card reader with the smart card having a fourth orientation relative to the smart card reader, the fourth orientation being different than the first, second, and third orientations.

4. The smart card of claim 1 wherein each of said sectors includes a label identifying an account associated therewith, each label positioned on the smart card to facilitate selection of one of the accounts by selectively orienting the smart card before inserting the smart card into the smart card reader.

5. The smart card of claim 1 wherein each of said sectors represents a different account and wherein at least one of said sectors has transaction processing electronics configured in a read-only mode.

6. The smart card of claim 5 wherein at least one of said accounts is accessible with an authorization code.

7. The smart card of claim 6 wherein another of said accounts is accessible without an authorization code.

8. The smart card of claim 1 wherein said smart card has a symmetric planar shape selected from the group consisting of: a triangle, a rectangle, a polygon, and a circle.

9. A smart card reader comprising:
   a processor for processing data received from a smart card;
   a keypad for receiving user input;
   a display screen;
   a slot for receiving a smart card, said smart card including a plurality of sectors wherein each sector includes a respective set of transaction processing electronics for performing account transactions in a manner independently operable from every other of said sectors; and
   a set of transaction processing electronics located interior to said slot and adapted to facilitate communication with only one selected set of said respective sets of transaction processing electronics, the orientation of the card in the slot determining selection of the selected set of transaction processing electronics.

10. A method of performing a smart card transaction, comprising the steps of:
    selecting a smart card account for performing the transaction;
    orienting the smart card relative to a smart card reader based upon the selected account;
    inserting the smart card into the smart card reader, the smart card being oriented relative to the smart card reader in accordance with the selected account; and
    performing the transaction.

* * * * *